(12) United States Patent
Babler et al.

(10) Patent No.: US 8,402,730 B2
(45) Date of Patent: Mar. 26, 2013

(54) MULTI-AXIS FLOATING MERGER SUSPENSION

(75) Inventors: Damion D. Babler, Albany, WI (US); Dorian V. Lust, Oregon, WI (US)

(73) Assignee: Kuhn North America, Inc., Brodhead, WI (US)

(*) Notice: Subject to any disclaimer, the term of this patent is extended or adjusted under 35 U.S.C. 154(b) by 589 days.

(21) Appl. No.: 12/412,048

(22) Filed: Mar. 26, 2009

(65) Prior Publication Data
US 2009/0241503 A1    Oct. 1, 2009

Related U.S. Application Data

(60) Provisional application No. 61/039,656, filed on Mar. 26, 2008.

(51) Int. Cl.
*A01D 78/00* (2006.01)
(52) U.S. Cl. .......................... 56/366; 56/15.8
(58) Field of Classification Search ................ 56/192, 56/228, 366, 376, DIG. 10, DIG. 21, 15.8
See application file for complete search history.

(56) References Cited

U.S. PATENT DOCUMENTS

| | | | |
|---|---|---|---|
| 2,795,100 A * | 6/1957 | Sund ............................. | 56/364 |
| 3,474,605 A * | 10/1969 | Resetich ..................... | 56/16.4 R |
| 3,771,302 A * | 11/1973 | Vogt ............................. | 56/364 |
| 3,783,594 A * | 1/1974 | Watt et al. .................... | 56/15.8 |
| 3,832,837 A * | 9/1974 | Burkhart et al. .............. | 56/218 |
| 4,793,125 A * | 12/1988 | Ehrhart et al. ................ | 56/16.1 |
| 4,910,951 A * | 3/1990 | Reilly et al. .................. | 56/376 |
| 5,177,944 A * | 1/1993 | Finlay ........................... | 56/365 |
| 5,203,154 A * | 4/1993 | Lesher et al. ................. | 56/366 |
| 5,507,139 A * | 4/1996 | Delperdang et al. .......... | 56/366 |
| 6,205,757 B1 | 3/2001 | Dow et al. | |
| 6,212,865 B1 * | 4/2001 | Peeters et al. ................ | 56/366 |
| 6,715,274 B2 * | 4/2004 | Peeters et al. ................ | 56/376 |
| 6,971,225 B1 * | 12/2005 | Kempf et al. ................. | 56/398 |
| 7,310,929 B2 | 12/2007 | Dow et al. | |
| 7,628,004 B2 * | 12/2009 | Geiser ........................... | 56/192 |
| 7,673,439 B2 * | 3/2010 | Geiser ........................... | 56/192 |
| 7,958,707 B2 * | 6/2011 | Thompson et al. ........... | 56/15.8 |
| 2006/0254244 A1 * | 11/2006 | Geiser ........................... | 56/370 |
| 2010/0031622 A1 * | 2/2010 | Frey .............................. | 56/366 |
| 2010/0037584 A1 * | 2/2010 | Dow et al. .................... | 56/376 |
| 2011/0203244 A1 * | 8/2011 | Dow et al. .................... | 56/192 |

OTHER PUBLICATIONS

Brochure: Power Mergers Merge-Maxx 300, © Kuhn Farm Machinery, Inc. p. 68. Sep. 2007.
Brochure: MM MergeMaxx ™ Power Merger MM 300. "Fast and Effective Hay Merging!" Copyright 2007 Kuhn Farm Machinery, Inc.

* cited by examiner

*Primary Examiner* — Thomas B Will
*Assistant Examiner* — Joan D Misa
(74) *Attorney, Agent, or Firm* — Oblon, Spivak, McClelland, Maier & Neustadt, L.L.P.

(57) ABSTRACT

A crop merging machine includes a trailer frame, a drawbar assembly coupled to an axle, and a header assembly including a frame and a wheel. The merging machine further includes a pick-up assembly coupled to the header frame and a cross-conveyor assembly coupled to the header frame adjacent to the pick-up assembly. The pick-up and cross-conveyor assemblies are configured to cooperate to lift crop materials off the field surface and move the crop materials laterally to discharge onto the field surface to form a windrow. The merging machine includes a suspension assembly disposed between the trailer frame and header assembly, the suspension assembly being coupled to the header assembly and trailer frame and configured to allow the header assembly to pivot, relative to the trailer frame, about a first axis of rotation and to pivot about a second, distinct axis of rotation to follow a contour of the field surface.

13 Claims, 18 Drawing Sheets

Fig. 11a
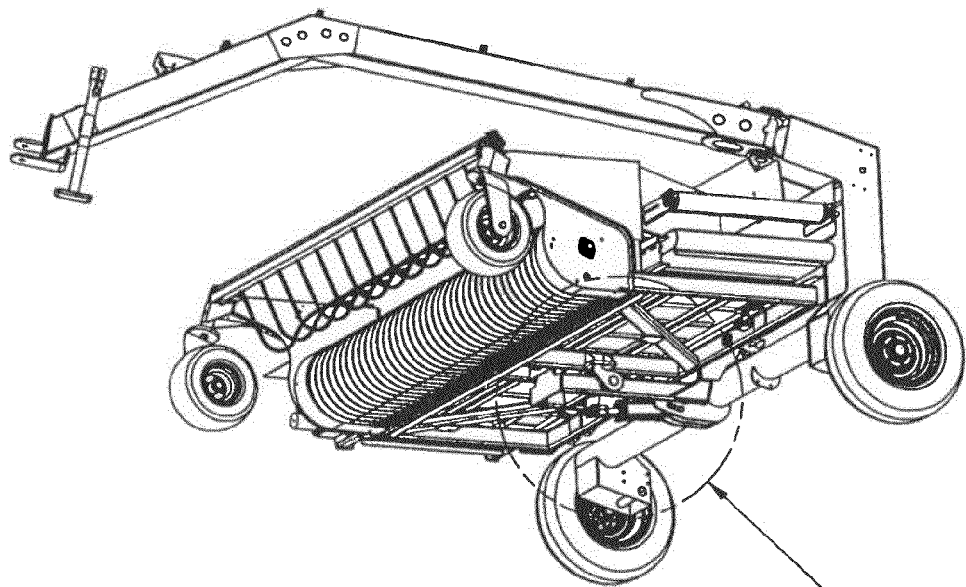
SEE DETAIL A
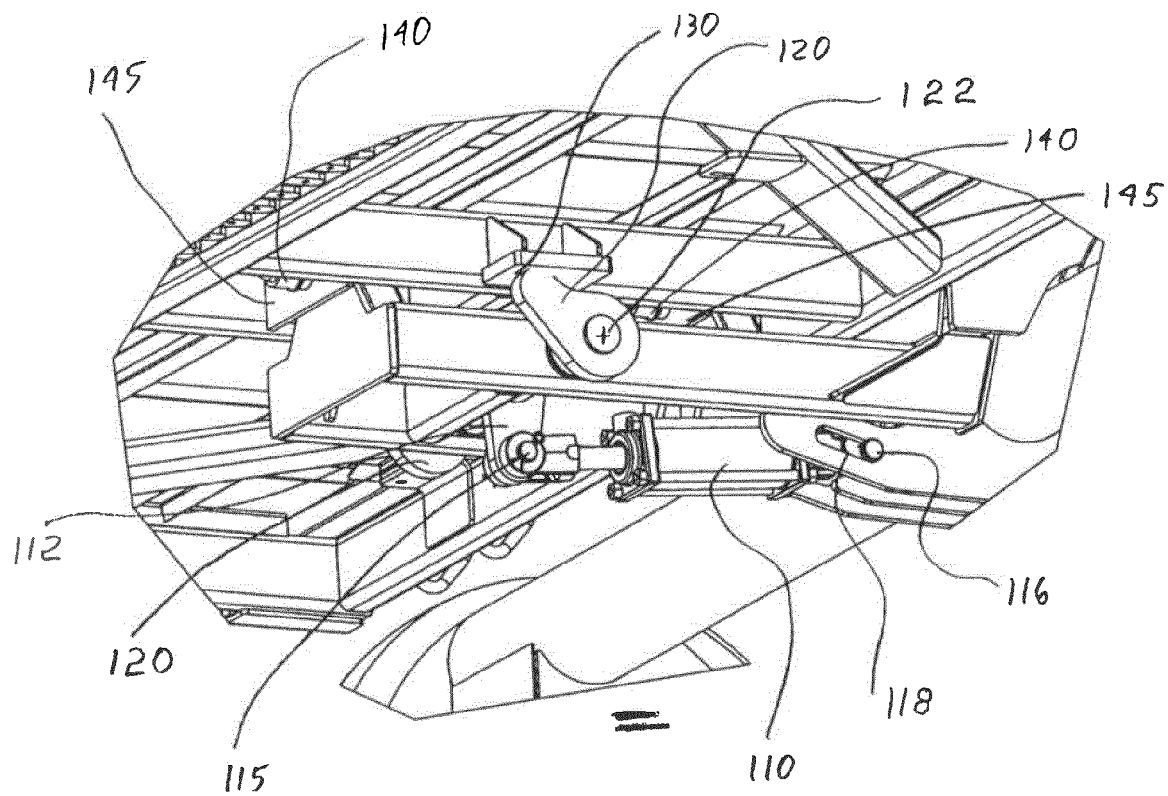
Fig. 11b

Fig. 13a
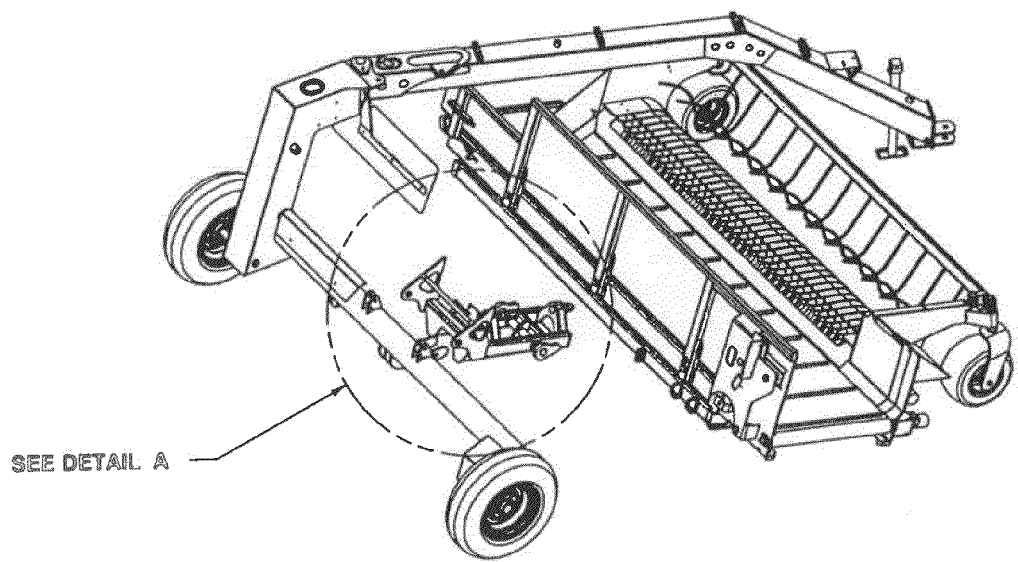
SEE DETAIL A
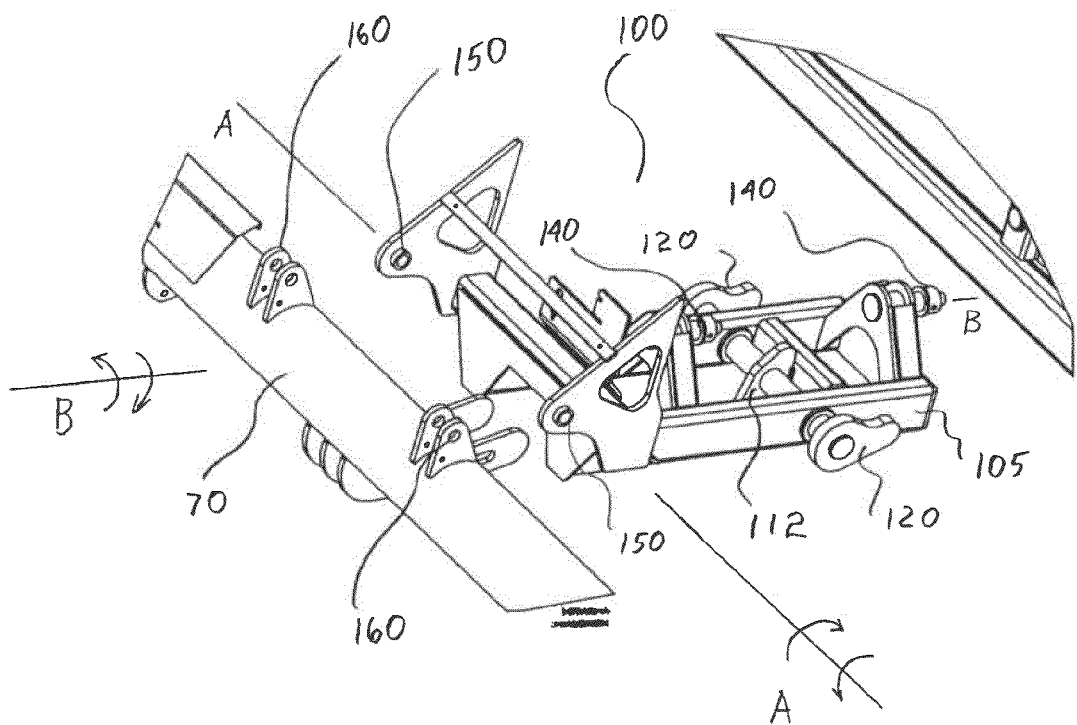
Fig. 13b

MULTI-AXIS FLOATING MERGER SUSPENSION

BACKGROUND OF THE INVENTION

1. Field of the Invention

This invention relates to a windrow merger. In one embodiment, the invention relates to a merger for a single windrow. In one example, the invention relates to a ground contour following 3-D floatation header for enhanced collection of crop in the field.

2. Description of the Related Art

Windrow mergers are commonly used in the agricultural field for combining windrows or rows of crops. In some applications, the windrow merger is pulled along a direction of travel in the field by a towing vehicle such as a tractor or other motorized vehicle. The towing vehicle will typically make several passes with the windrow merger, combining windrows with each pass. Later, a forage harvester or baler harvests the combined windrows. By combining the windrows, the merger makes each pass with a forage harvester or baler more productive. The merger also operates to turn over the windrows, enhancing drying and conditioning of crops. Use of a merger also reduces fuel costs, man-hours, and wear and tear on the harvester or baler equipment.

Conventional single windrow mergers may have certain drawbacks. For example, conventional mergers sometimes do not follow the ground contour very well and therefore wastefully leave crop in the field. Some conventional mergers have gage wheels on each side of a header that keeps the head at a certain distance from the ground, allowing the header to pivot about an axis that is perpendicular to the direction of travel. Allowing this rotation typically provides the ability to raise and lower the header. As the gage wheels encounter obstructions in a field position, the gage wheels raise the full header up and over the obstruction and back down on to the level ground. As the gage wheel rolls over the obstruction and the full head is raised, even the end of the header that does not encounter the obstruction. In other words, the right and left ends of the header travel in the vertical direction together, and crop in the windrow may be missed and not gathered into the newly formed windrow when one of the gage wheels encounters a small obstruction. Any crop left in the field amounts to lost productivity. Such losses include reduced overall yields of the field, delay of re-growth in these areas, and reduced cleanliness of the field.

SUMMARY OF THE INVENTION

Accordingly, one aspect of the present invention provides a header with 3-D (pivotable about two distinct axes) floatation on a windrow merger, for example, a single windrow merger, that better follows the contour of the ground while in a field position so that crop is gathered in a relatively efficient manner.

One example of an agricultural machine according to the invention includes at least one drawbar, a trailer frame, a lift arm, and a header that picks up crop. The header includes a unit to pick up material from the ground and move the material onto a cross conveyor. The header typically includes a float mechanism (suspension assembly) to allow movement about two axes (A) and (B) during field use. For example, the header is typically configured to pivot about an axis (A) perpendicular (as viewed from above) to the direction of travel. The header also pivots about an axis (B) parallel (as viewed from above) to the direction of travel. The unit typically includes a leveling, locking, or biasing mechanism to keep the head in a level position during transport outside of the field, for example, on public roads.

One example of the invention provides a crop processing unit suspension assembly. The suspension assembly includes a frame assembly, at least one linear actuator, such as a fluid powered cylinder, including first and second coupling portions, configured to change a distance between the first and second coupling portions. In the case of a fluid powered cylinder, the change in length is based on a change in fluid pressure within the at least one fluid powered cylinder. In the case of an electrical linear actuator, the change in length is based on an electrical signal. A first pivot device is disposed on the frame assembly and configured to rotate about a first axis. For example, the first pivot device may be a bushing, ball bearing, roller bearing etc. The suspension includes a second pivot device disposed on the frame assembly and configured to rotate about a second axis perpendicular to the first axis. Similar pivot devices may be used for both the first and second pivot devices, but the axes of rotation will be as defined above. The suspension includes at least one rotatable finger, preferably two fingers, coupled to the frame assembly and the at least one fluid powered cylinder via a rotatable linkage. The at least one rotatable finger is configured to rotate about a third axis relative to the frame assembly via a third pivot device in response to a change in distance between the first and second coupling portions.

One aspect of the invention provides an agricultural crop merging machine configured to move in a direction of travel in a field. The merging machine includes a trailer frame including at least one axle, at least one trailer wheel coupled to the at least one axle and configured to rotate about a main axis of rotation and to roll along a field surface, and a drawbar assembly coupled to the at least one axle. The merging machine includes a header assembly including a header frame, at least one header ground-engaging unit coupled to the header frame, a pick-up assembly coupled to the header frame, and a cross-conveyor assembly coupled to the header frame adjacent to the pick-up assembly, the pick-up and cross-conveyor assemblies being configured to cooperate to lift crop materials off the field surface and move the crop materials laterally to discharge onto the field surface to form a windrow. The merger machine also includes a suspension assembly disposed between the trailer frame and header assembly, the suspension assembly being coupled to the header assembly and trailer frame and configured to allow the header assembly to pivot, relative to the trailer frame, about a first axis of rotation perpendicular to the main axis of rotation of the at least one wheel and to pivot about a second axis of rotation parallel to the main axis of rotation of the at least one wheel to follow a contour of the field surface.

BRIEF DESCRIPTION OF THE DRAWINGS

These and other advantages of the invention will become more apparent and more readily appreciated from the following detailed description of the exemplary embodiments of the invention taken in conjunction with the accompanying drawings where:

FIG. 9b is a detail view identified in FIG. 9a;

FIG. 11a is a similar view to the one shown in FIG. 10, but with a section of detail identified;

FIG. 11b is a detail view identified in FIG. 11a;

FIG. 13a is a similar view to the one shown in FIG. 12, but with a section of detail identified;

FIG. 13b is a detail view identified in FIG. 13a;

DETAILED DESCRIPTION OF THE PREFERRED EMBODIMENTS

Figure 1:
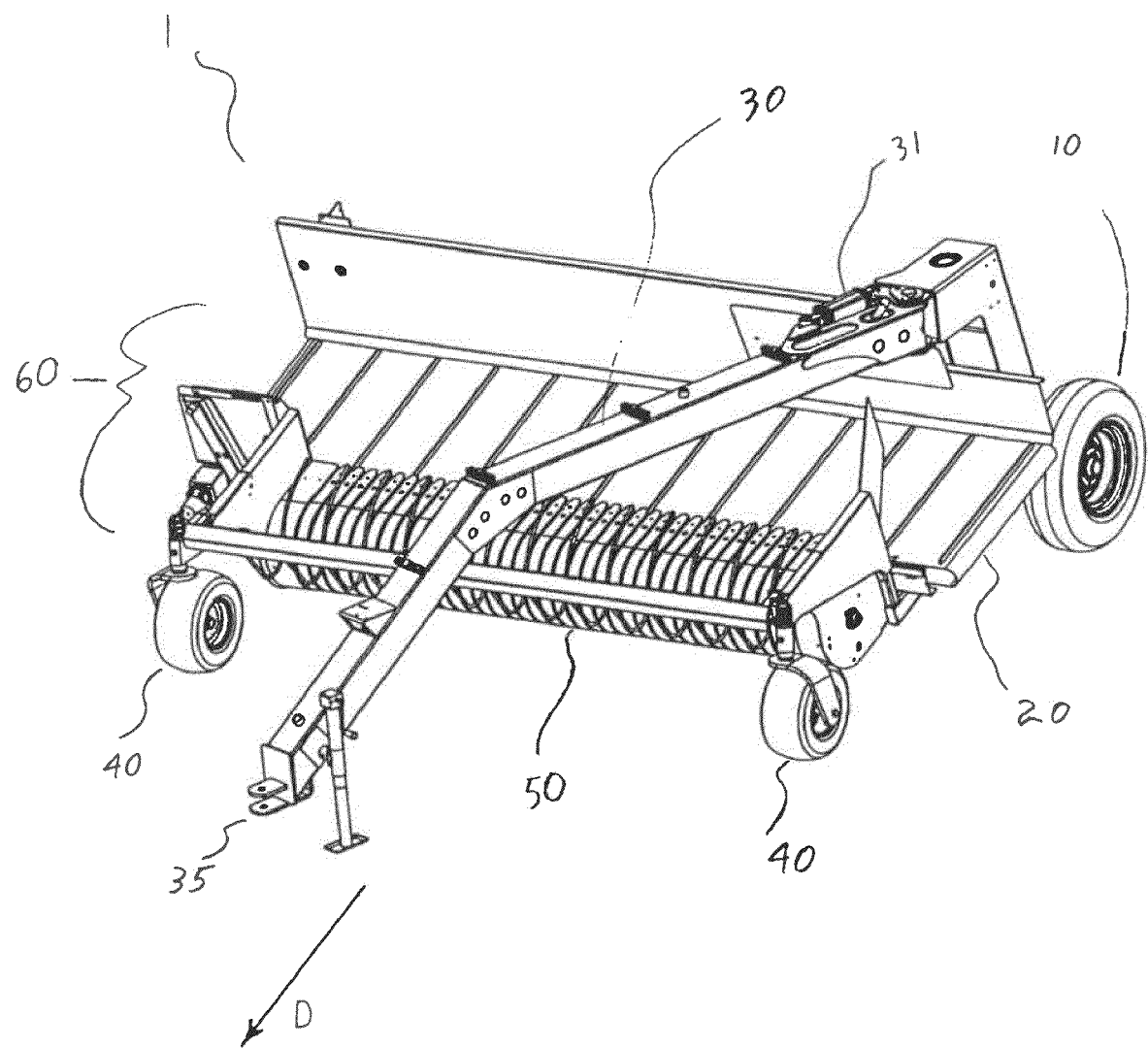
FIG. 1 is a front-left elevated perspective view of one non-limiting example of the present invention.
Figure 2:
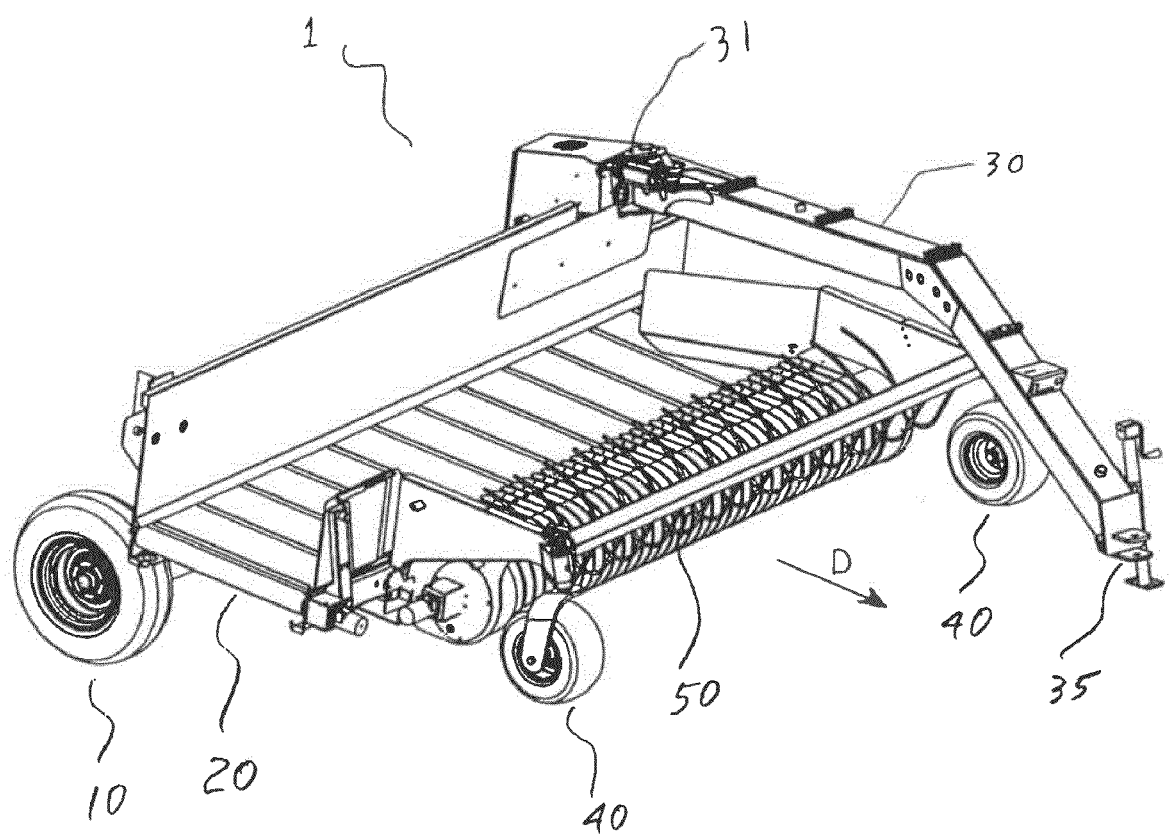
FIG. 2 is a front-right elevated perspective view of the example shown in FIG. 1.
Figure 3:
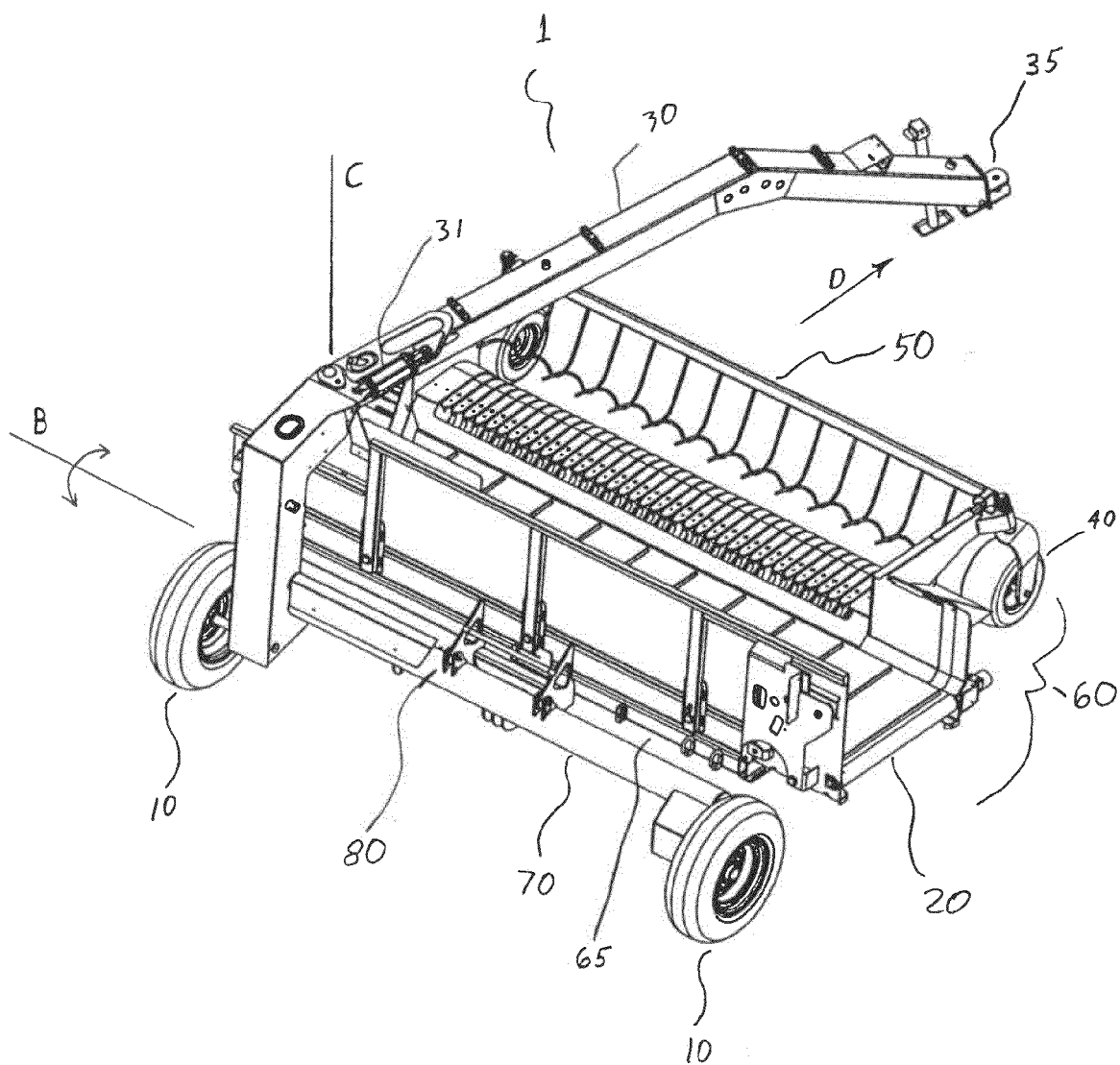
FIG. 3 is a rear-right elevated perspective view of the example shown in FIG. 1.

With reference to FIGS. 1-3, one example of a merger 1 according to the invention is shown in perspective view. The merger 1 includes at least one ground-engaging trailer wheel 10, preferably at least two ground-engaging trailer wheels 10, coupled to a main axle 70, which is a component included in a trailer frame 80. A drawbar assembly 30 is also coupled to the trailer frame 80 and is configured to removably connect with a pulling vehicle such as a tractor or truck via a conventional connection or coupling such as a clevis 35, for example. The vehicle typically pulls the merger 1 in a direction D shown by arrows in FIGS. 1-3 during a normal operation of merging crop material. The example of the merger 1 depicted in FIGS. 1-3 includes a pair of header ground-engaging units, header wheels 40 in this example, which are configured to roll in the direction D.

The merger 1 shown in FIGS. 1-3 includes a header assembly 60 supported by a header frame 65 and the header wheels 40 (header ground-engaging units). The header assembly 60 includes a pick-up assembly 50 that picks up crop material in the field when the merger 1 is pulled in the direction D. The pick-up assembly 50 can be any of a variety of pick-up devices common to merger machines such as, for example, a tined wheel or rake. The pick-up assembly 50 deposits the crop material on the cross-conveyor 20, which may comprise a conveyor belt, chain, or auger type device, and the cross-conveyor 20 moves the crop material either to the left or to the right with respect to the direction D, thus forming a windrow or composite windrow (combination of more than one windrow). In other words, the pick-up assembly 50 may be used to pick up material that has been cut and left in place, for example, in a cut swath, or the pick-up assembly 50 may be used to merge two or more pre-existing windrows. Typically, the merger 1 is coupled to a power-take-off (PTO) such as those frequently provided with standard tractors in order to apply power to the pick-up assembly 50 and/or cross-conveyor 20 in a conventional manner common to many existing agricultural machines. Alternatively or additionally, the pick-up assembly 50 and/or cross-conveyor 20 may be operated with one or more motors 52 (see FIGS. 6 and 7), which can be either hydraulic or electric as is conventional in the art. For example, the motor 52 can operate a pulley and belt arrangement that rotates the cross-conveyor 20 in response to a hydraulic or electrical signal sent from the pulling vehicle. Similarly, the pick-up assembly 50 may be controlled based on a hydraulic or electrical signal from the pulling vehicle.

The header assembly 60 typically includes a header frame 65 coupled to at least one header wheel 40. The header wheels 40 are typically arranged to roll in the direction D, but may also be casters configured to pivot in order to change directions in order to follow the pulling vehicle.

Figure 15:
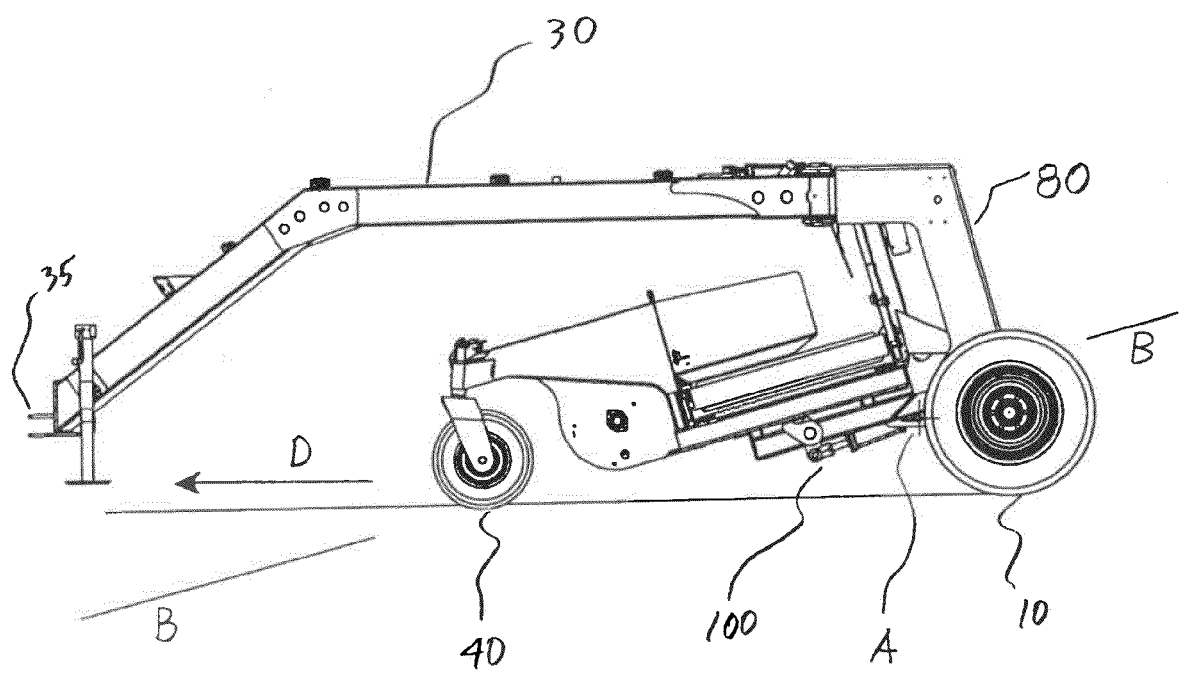
FIG. 15 is a view of the example depicted in FIG. 14 during transition from the work state to the transport state, shown from the left side.

The header assembly 60 is configured to pivot about first and second pivots centered on first and second distinct axes (see FIGS. 6, 7, 13b, and 15). The system that allows pivoting is the suspension assembly 100, shown in detail in FIGS. 9b, 11b, and 13b. A first of the axes, axis B, about which the header assembly 60 pivots is parallel, as viewed from above the merger 1, to the direction of travel D. A second of the axes about which the header assembly 60 pivots, axis A, is perpendicular, as viewed from above the merger 1, to the direction of travel D. The ability to pivot about two different axes allows the header assembly 60 to follow the contour of the ground better and therefore, to pick up a relatively high percentage of the material lying on the ground while still being able to accommodate hilly, rocky, or pitted terrain. As shown in FIGS. 13b and 15, the axis B is not necessarily parallel to the direction of travel D in all views. Rather, the axis B may be parallel to the direction D only when viewed directly from the top or bottom and may be at a non-zero angle with respect to the direction D when viewed from the left or right side of the merger 1.

The ability of the header assembly 60 to pivot about the axis B allows the header assembly 60 to accommodate bumps or holes encountered by either the side of the header assembly 60. For example, if the merger 1 is pulled over a rock or small hill that impacts a first of the header wheels 40, but that does not impact second of the header wheels 40, the header assembly 60 will be able to rotate about the axis B to allow the second of the header wheels 40 to remain in contact with the ground, and therefore, the header assembly 60 will be able to continue to pick up crop material that otherwise would have been missed. In one example, each end of the header assembly 60 is able to travel approximately (+/−10%) ten inches upward relative to the normal level assumed during travel over perfectly level ground and six inches downward relative to this level. Additionally, if the header assembly 60 encounters a long ridge, furrow, or trough, both ends of the header assembly 60 are able to move upward or downward in unison by pivoting about the second of the pivots (around axis A). Thus, the header assembly 60 is able to "float" with a 3-dimensional (3D) effect in order to accommodate variances in the shape of the ground across which the header assembly 60 travels.

In one embodiment, the drawbar assembly 30 is configured to pivot along arc P about a pivot point centered on an axis C (shown in FIGS. 3 and 6) to switch between a narrow state and wide state. In one example, the drawbar assembly 30 pivots in response to a change in length of a linear actuator such as a pneumatic or hydraulic cylinder 31 (shown in FIG. 6). The cylinder 31 may be replaced or supplemented by an electric linear actuator. The transport position is typically the narrowest arrangement of the merger 1 with respect to the direction D. This arrangement facilitates transport of the merger 1 on public roads. In other embodiments, the drawbar assembly 30 is rigidly fixed to the trailer frame 80 and cannot rotate relative to the main axle 70 of the trailer frame 80. This arrangement simplifies the construction of the merger 1 and may reduce the number of pneumatic or hydraulic outputs the vehicle pulling the merger 1 must provide.

Figure 4:
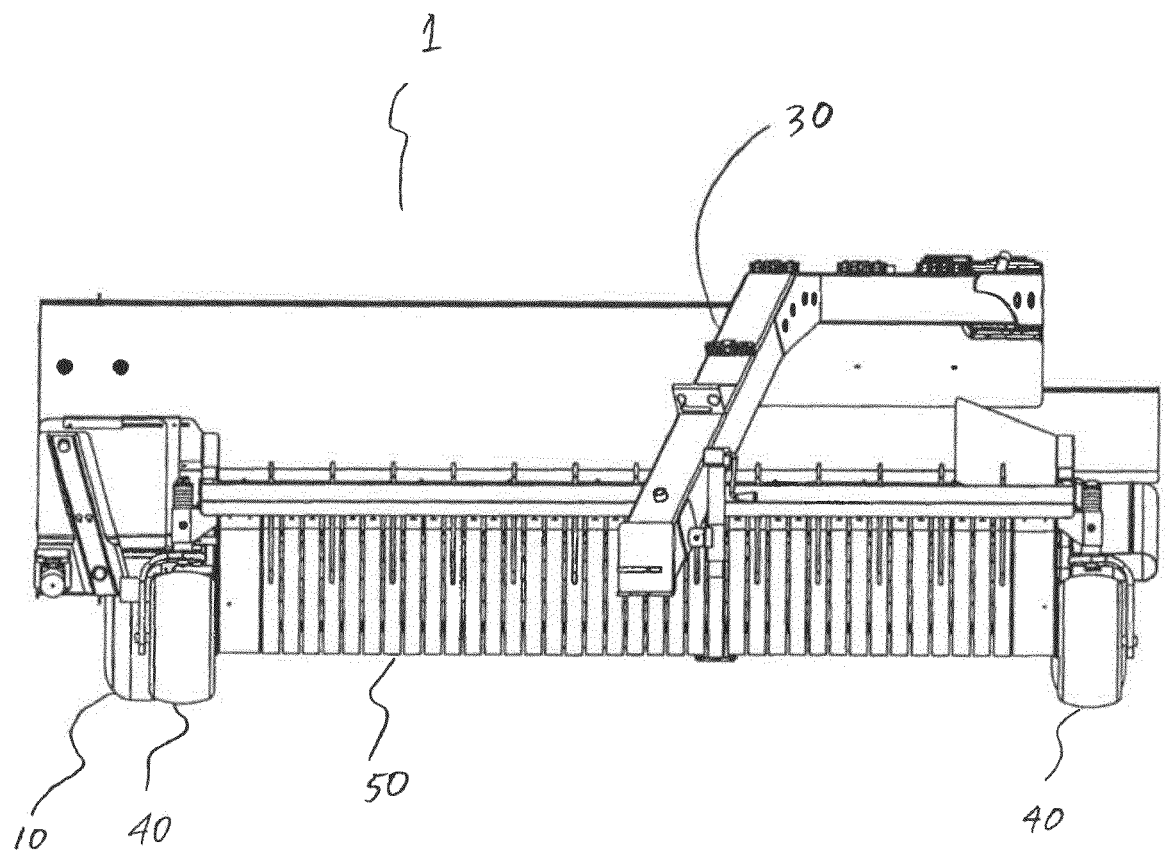
FIG. 4 is a front view of the example shown in FIG. 1.

FIG. 4 shows a front view of the merger 1. As shown in FIG. 4, the drawbar assembly 30 is angled inward such that the clevis 35 is disposed between the two header wheel 40 as viewed along the direction D. In this narrow state, the vehicle travels directly in front of at least a portion of the pick-up assembly 50 and therefore, resides in the work path of the merger 1. This state can be used for picking up crop material or for transport.

In embodiments in which the drawbar assembly 30 can pivot with respect to the main axle 70 of the trailer frame 80, the drawbar assembly 30 may be angled either inward or outward along arc P such that the clevis 35 is disposed between or outside of, respectively, the two header wheels 40. When the drawbar assembly 30 is angled such that the clevis 35 is disposed outward of the two header wheels 40, the vehicle used to pull the merger 1 may be disposed outside of the work path of the pick-up assembly 50 of the merger 1. Therefore, the pick-up assembly 50 may be more effective than when the drawbar assembly 30 is angled inward inasmuch as the crop material intended to be picked up by the pick-up assembly 50 will typically be left untrampled by the wheels of the pulling vehicle. Additionally, the driver of the vehicle may be better able to see the work path directly in front of the merger 1 when the drawbar assembly 30 is in the outer position.

Figure 5:
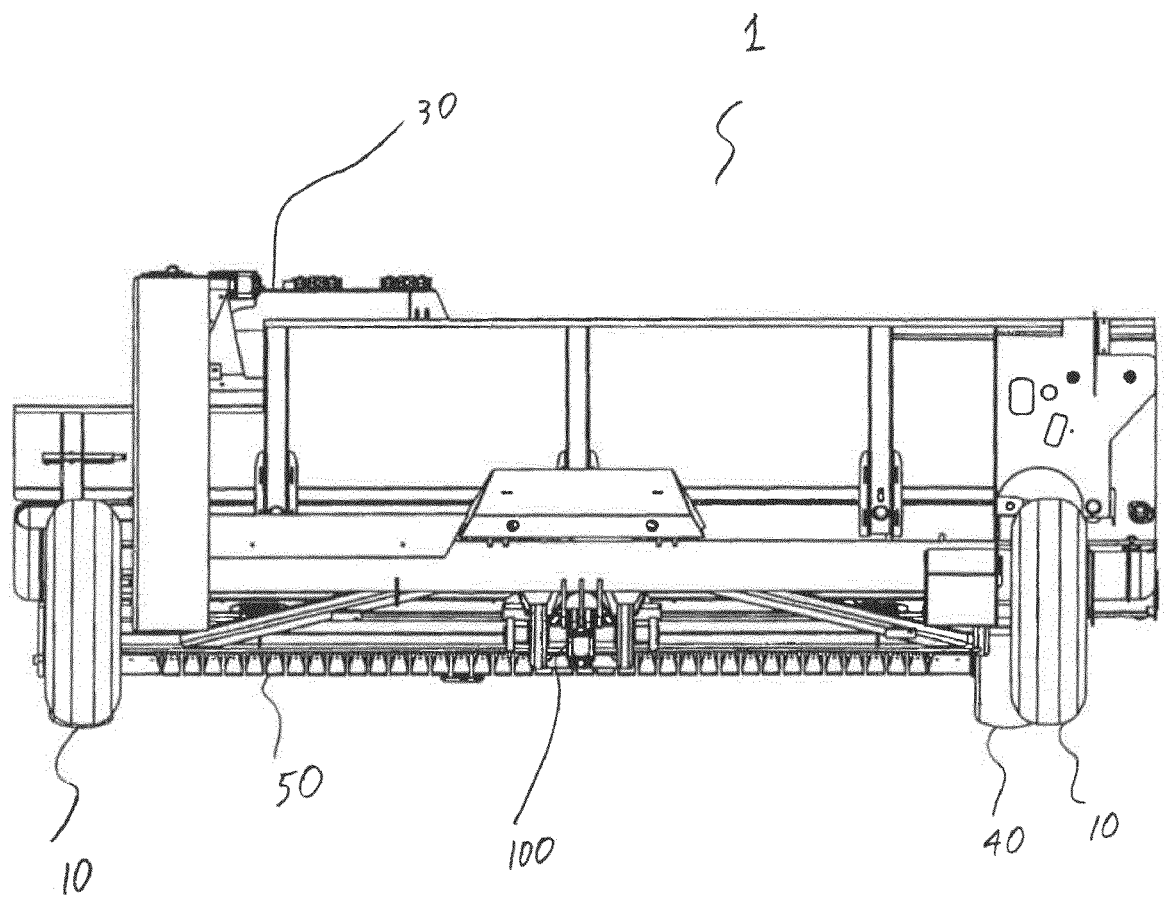
FIG. 5 is a rear view of the example shown in FIG. 1.

FIG. 5 depicts the merger 1 from behind and identifies the location of the suspension assembly 100. As shown in FIG. 5, the header wheels 40 are disposed in a downward position, and thus, the merger 1 is in a work state and not a transport state.

Figure 6:
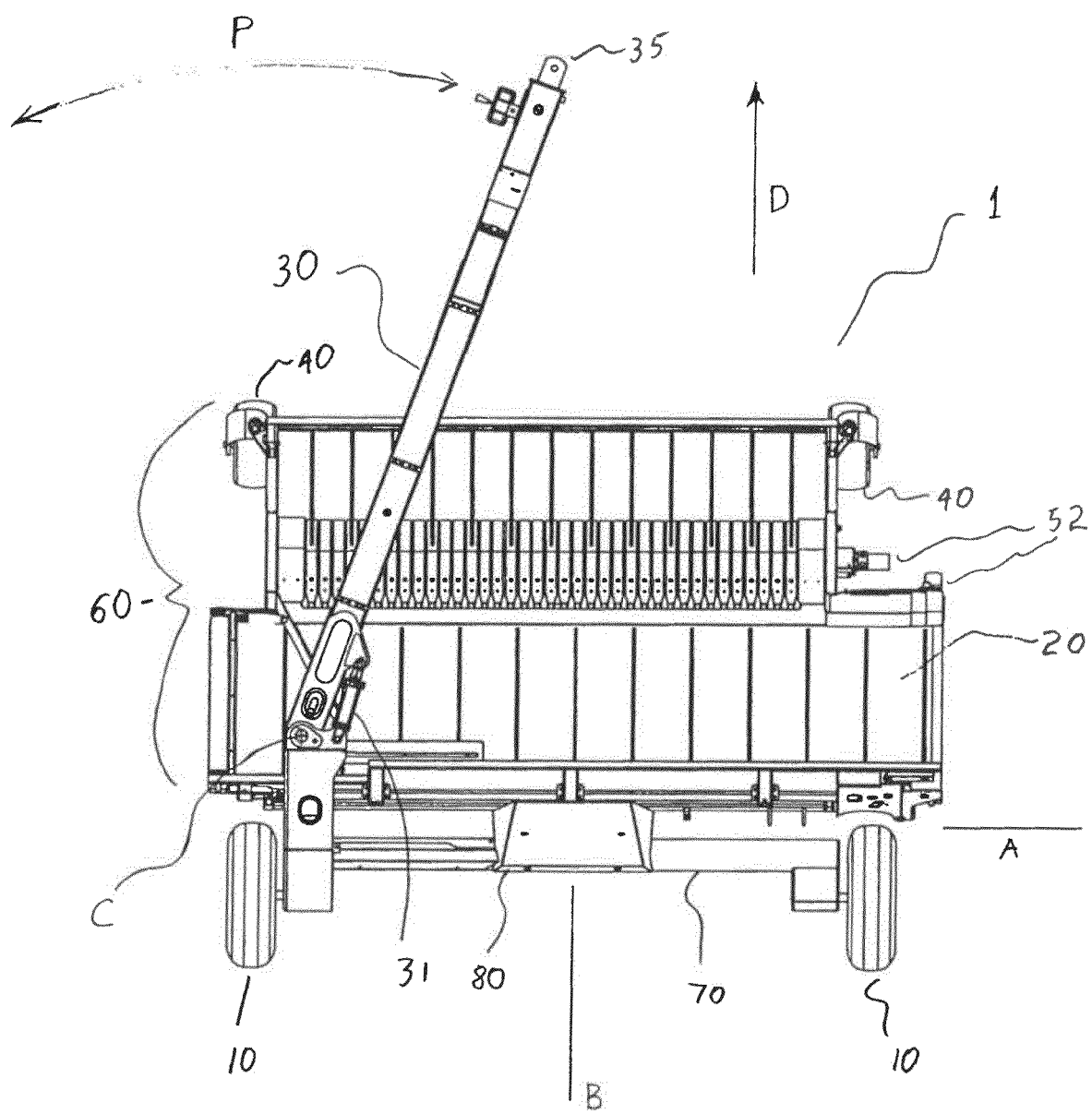
FIG. 6 is a top view of the example shown in FIG. 1.
Figure 7:
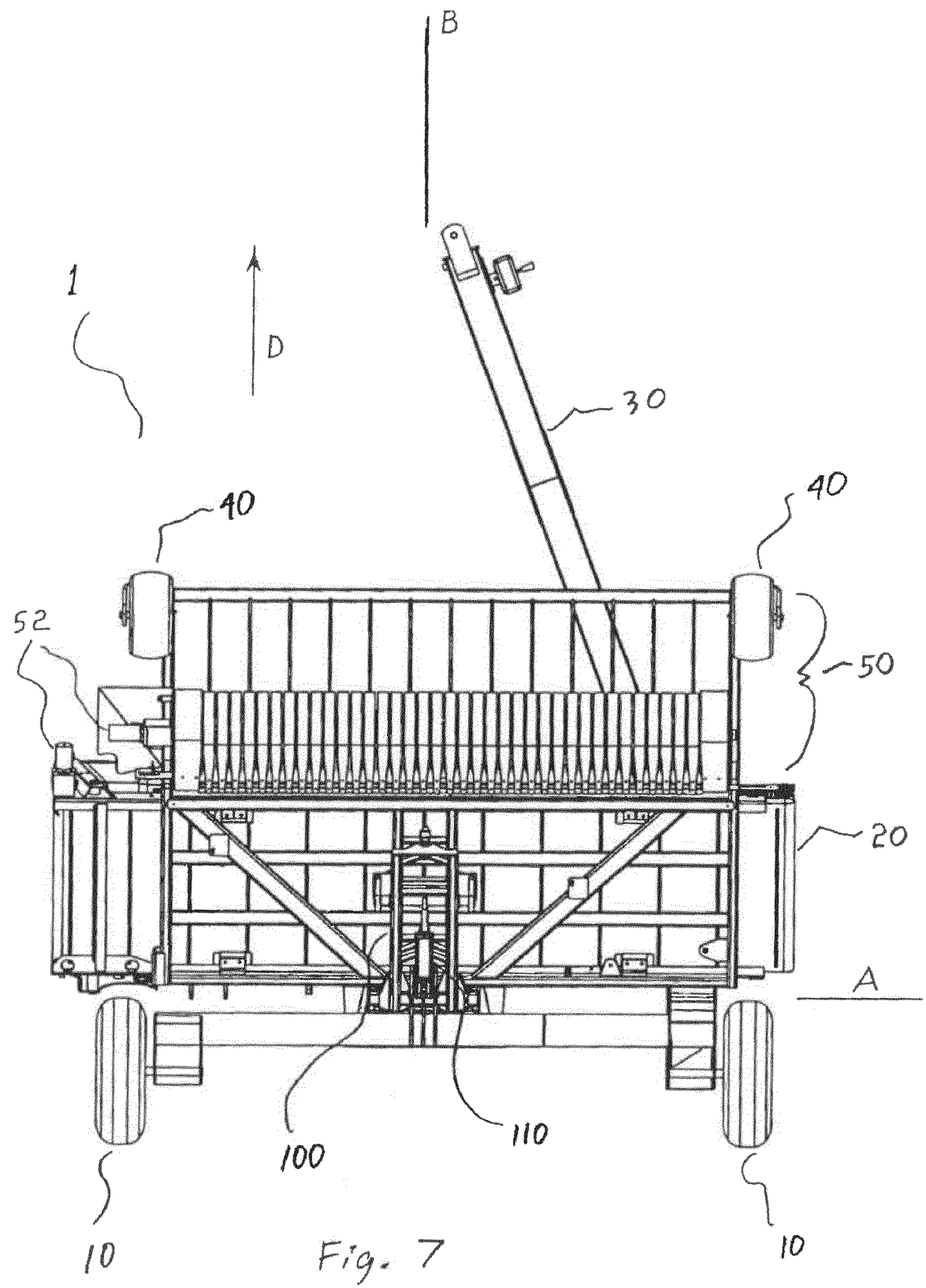
FIG. 7 is a bottom view of the example shown in FIG. 1.

FIGS. 6-7 depict the merger 1 from the top and bottom, respectively, and identify the first pivot axis B and second pivot axis A about which the header assembly 60 is configured to pivot.

Figure 8:
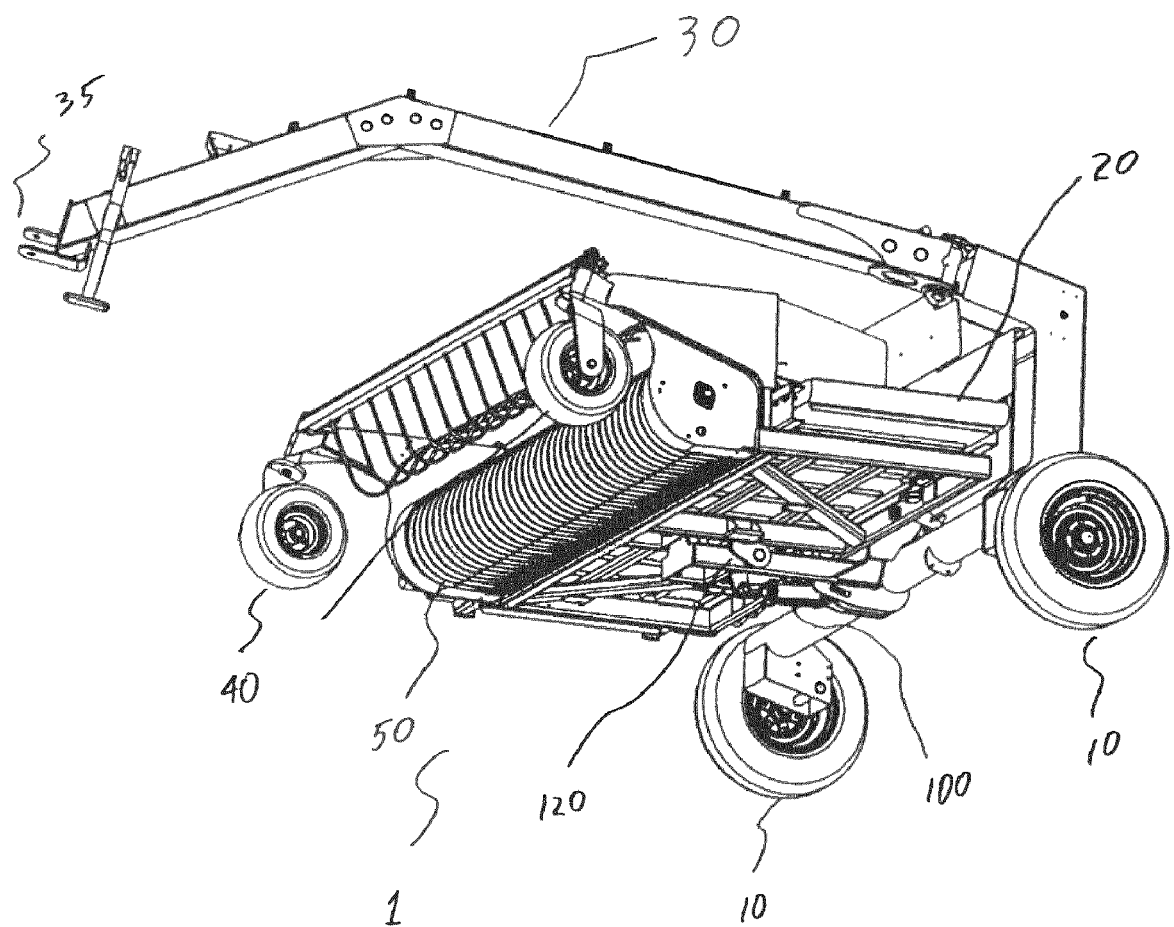
FIG. 8 is a bottom-left perspective view of the example shown in FIG. 1 in a work state.

FIG. 8 depicts the merger 1 from a bottom-left perspective in the work state. In the work state, the header assembly 60 is not raised, and the suspension assembly 100 is not locked in place via the rotatable finger 120 (locking finger). In other words, in the work state, the header ground-engaging unit(s) are in contact with the field surface, and the header assembly 60 pivots about the axis B in response to vertical movement of the header ground-engaging unit(s) due to bumps, rocks, and holes, etc.

Figure 9A:
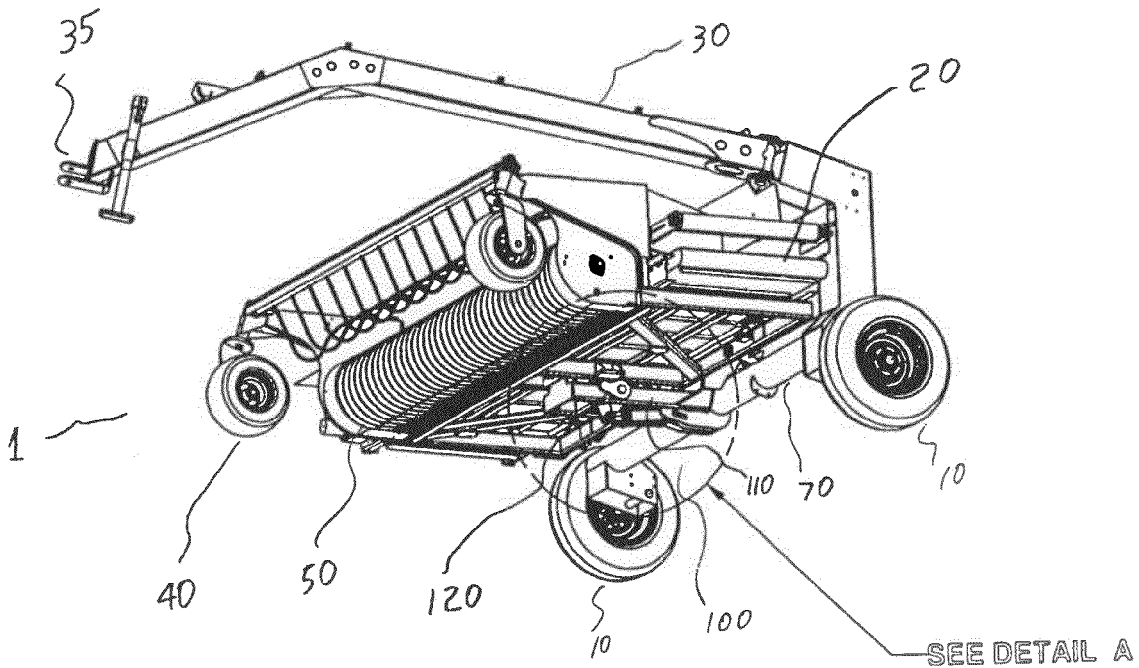
FIG. 9a is a similar view to the one shown in FIG. 8, but with a section of detail identified.
Figure 9B:
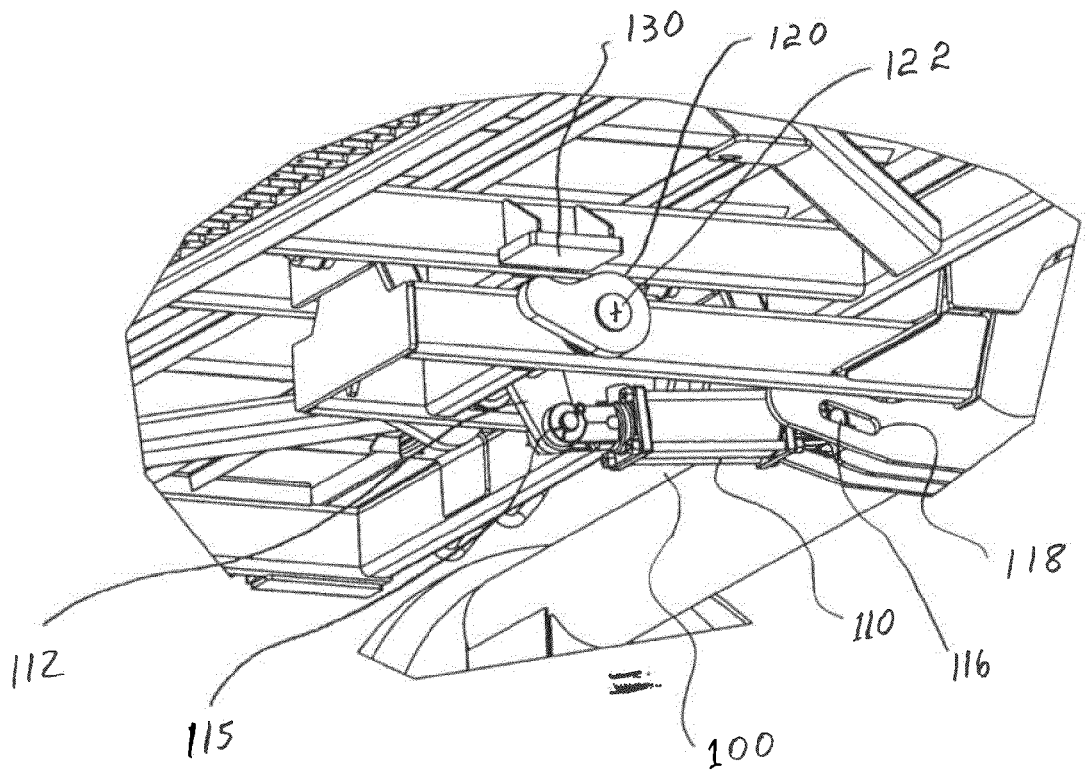
Figure 10:
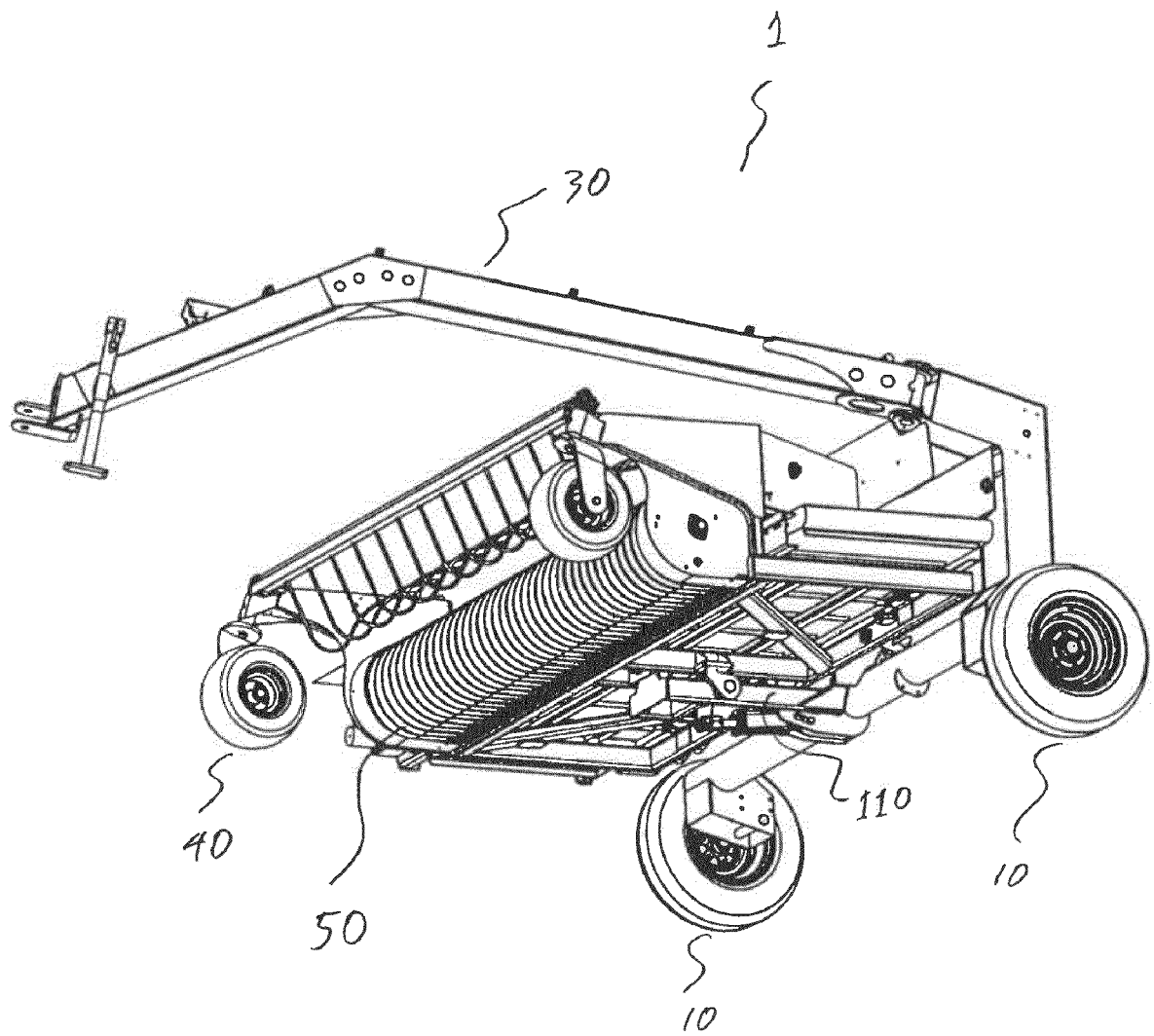
FIG. 10 is a bottom-left perspective view of the example shown in FIG. 1 in a transport state.
Figure 12:
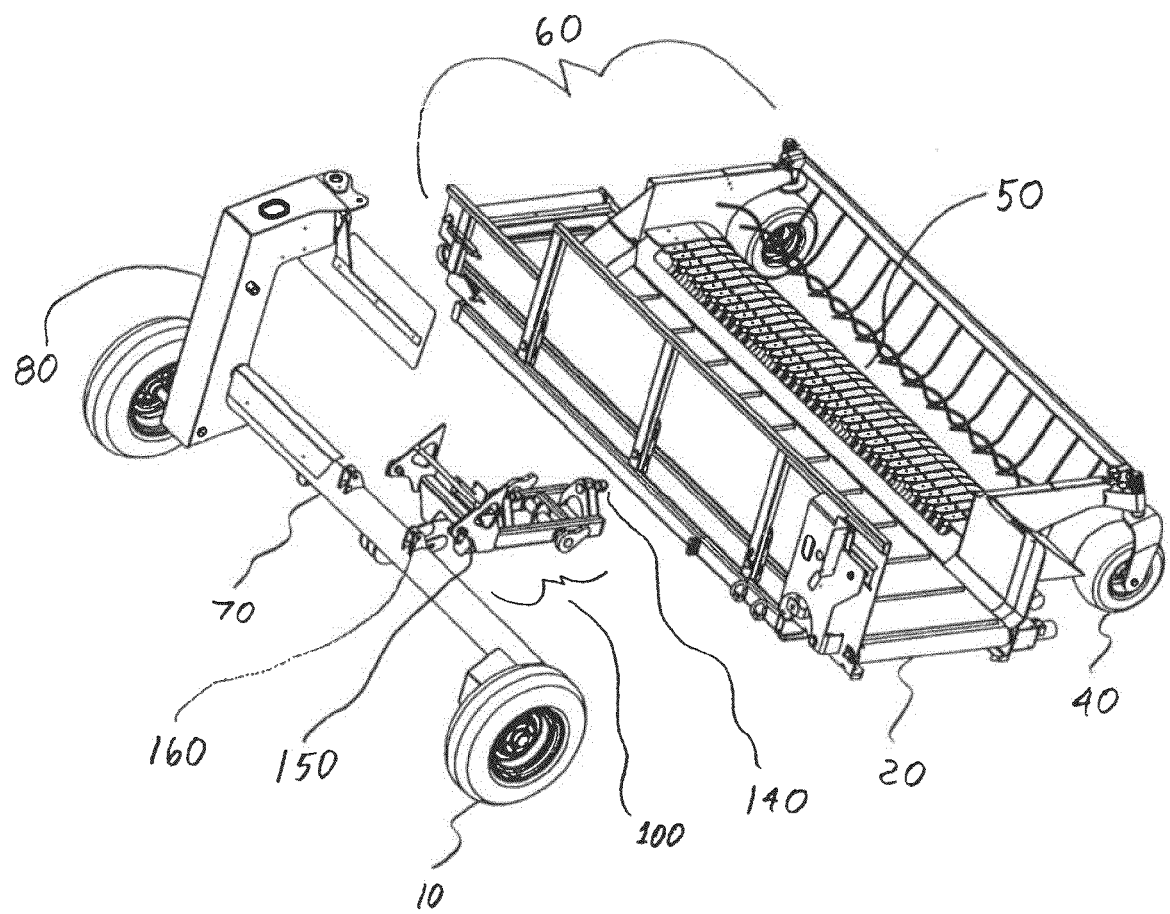
FIG. 12 is an exploded view of a header, floating suspension, and axle according to one example of the present invention.

FIG. 9a provides the same view of the merger 1 as FIG. 8, but with an area of detail identified, which is provided in FIG. 9b. A suspension assembly 100 is depicted in FIG. 9b and includes a linear actuator 110 coupled to the trailer frame 80 via a second cylinder pivot 116 disposed within a slot 118 at one end. The linear actuator may be an electric linear actuator or a fluid powered cylinder, such as a pneumatic or hydraulic cylinder. Typically, the linear actuator 110 is controlled via a signal, either fluid or electric, from the vehicle pulling the merger 1. The linear actuator 110 is coupled to the header assembly 60 via a first actuator pivot 115 and linkage 112 at an opposite end. The linkage 112 is connected to a pair of rotatable fingers 120 via a finger pivot 122. The finger pivot 122 is configured to rotate about an axis parallel to the axis A in response to a change in length to the linear actuator 110. As the finger pivot 122 rotates clockwise in FIG. 9b, the rotatable finger 120 rotates and impacts or abuts the abutting surface 130, which is rigidly attached to the header assembly 60. By abutting the abutting surface 130, the rotatable finger 120 lock the header frame 65 in place relative to the axis B. Additionally, the linear actuator 110 will continue to extend and cause the entire header assembly 60 to rotate about the axis A until the header assembly 60 reaches a maximum amount of possible travel, which is defined by another abutting surface, by a limit on the stroke of the linear actuator 110, or by a mechanical linkage. At this point, the header assembly 60 is locked in place relative to the axis A in addition to being locked in place relative to the axis B. Thus, by extending the linear actuator 110, the linear actuator 110 applies pressure to the header frame 65, locks the header assembly 60 in place relative to the axis B, then locks the header assembly 60 in place relative to the axis A. Additionally, the extension of the linear actuator 110 lifts the header assembly 60. One benefit of the above-noted arrangement is that a single electric, hydraulic, or pneumatic signal can cause the linear actuator 110 to move the header assembly 60 back and forth from a transport state to a working state in addition to providing a locking mechanism for the header assembly 60 in the transport state. During the working state, the rotatable fingers 120 are disengaged from the abutting surface 130 and allow the header assembly 60 to rotate about the axis B and the header assembly is also free to rotate about the axis A.

As shown in FIGS. 11b-13b, the suspension assembly 100 is configured to couple to the header assembly 60 via first pivot formed by a main longitudinal pivot 140, which defines the axis B. The main longitudinal pivot 140 may comprise a fixed shaft configured to rotate within a bearing. In the depicted example, the main longitudinal pivot 140 comprises two shafts, each disposed within a bracket 145. The bearing may be disposed within a pillow block attached to the header assembly 60 via the bracket 145. Alternatively, the pillow block and bearing may be disposed on the suspension assembly 100 while the shaft is disposed on the header assembly via the bracket 145. In another example, the longitudinal pivot may comprise a ball or universal joint. Thus, the main longitudinal pivot 140 supports the header assembly 60 from the rear while the header wheels 40 support the header assembly 60 from the front. The main longitudinal pivot 140 is mechanically connected to the trailer frame 80 via a pivot frame 105. As shown in FIG. 13b, the pivot frame 105 also supports the finger pivot 122, which is configured to pivot relative to the pivot frame 105 in response to a change in length of the linear actuator 110. At the rear of the pivot frame 105 are disposed a pair of stubs 150. The stubs 150 are configured to couple with the ears 160 via a long bolt, rod, or shaft (not shown). Once the stubs 150 are coupled to the ears 160, the entire suspension assembly 100 can rotate about the axis A when the header assembly 60 is in the work state. It should be noted that the particular stub and ear combination described in FIG. 13b may be replaced with other types of pivotable connections. For example, the stubs may be replaced with a shaft, bushing, ball or other mechanical connection that provides a similar rotation between the pivot frame 105 and the trailer frame 80.

As discussed previously, when the linear actuator 110 extends, the linkage 112 rotates the pair of rotatable fingers 120 to abut the abutting surface 130 and prevent the header assembly 60 from rotating about the axis B. It should be noted that the linkage 112 is coupled to the linear actuator 110, but also rotates relative to the linear actuator 110 as the linear actuator 110 changes length. As the linear actuator 110 further extends, the header assembly 60 is lifted and eventually locks with respect to the axis A. Thus, the header assembly is placed in the transport state. Accordingly, the two header wheels 40 provide two points of support for the header assembly 60, and the suspension assembly 100 provides a third point of support. In one example, only the three points of contact defined by the two header wheels 40 and the suspension assembly 100 are used to support the header assembly 60. Because the suspension assembly 100, the third contact point, allows the header assembly 60 to pivot about two distinct axes A and B, the suspension assembly 100 allows the header assembly 60 to accommodate for vertical movement of each of the header wheel 40 and thus provides a 3D floating effect. In response to a change in length of the linear actuator 110, the header assembly 60 is eventually restricted in rotational movement with respect to the axes A and B and is ultimately moved from a work state to a transport state in which the header wheels 40 are not in contact with the ground.

Figure 14:
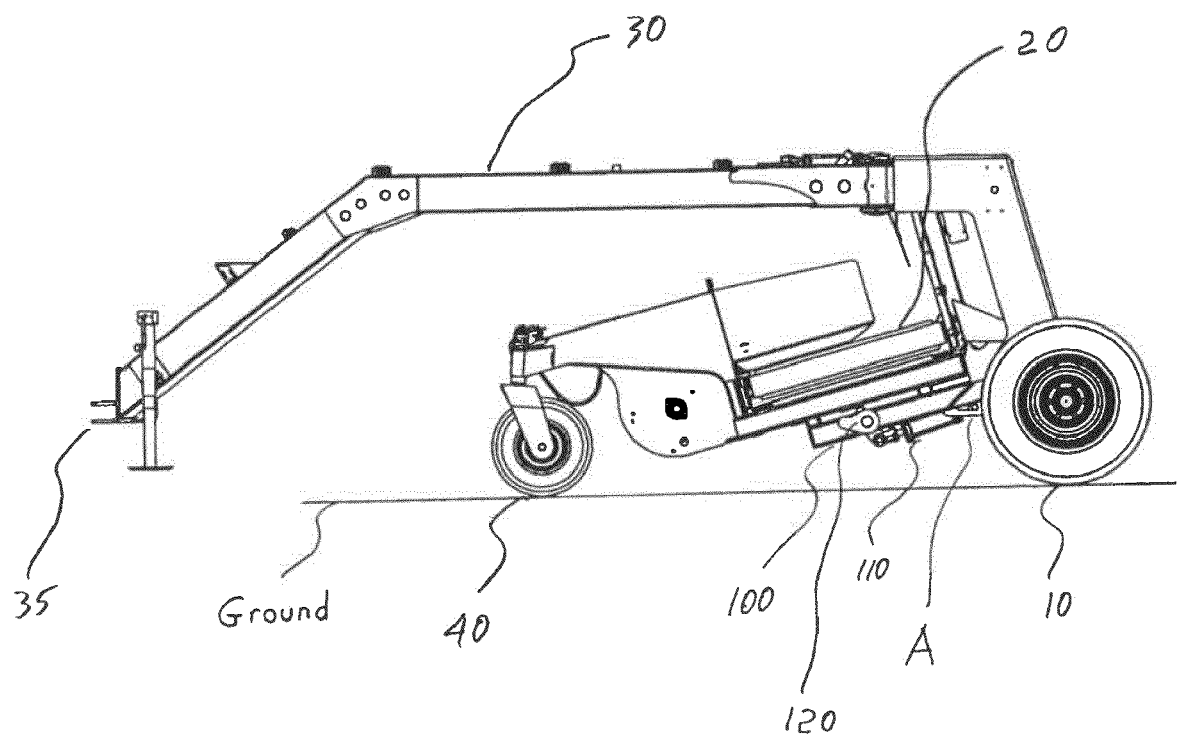
FIG. 14 is a left-side view of the example depicted in FIG. 1 in the work state.
Figure 16:
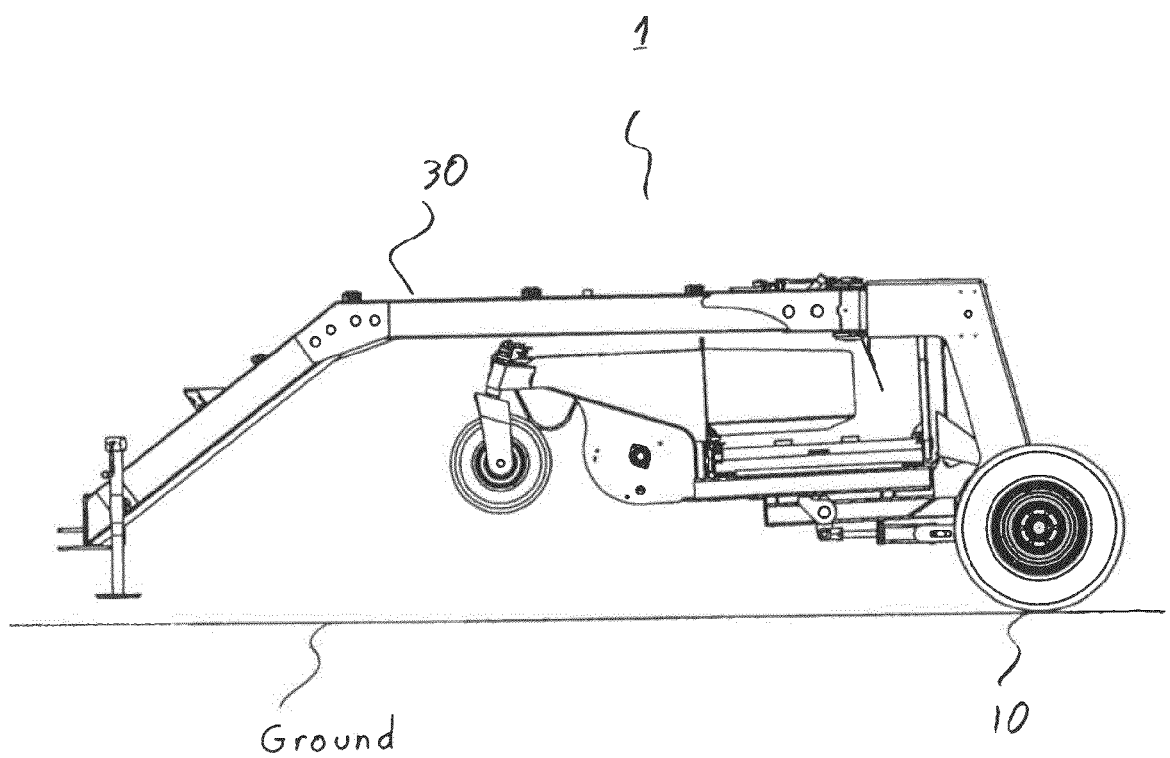
FIG. 16 is view of the example shown in FIG. 15 after completion of the transition from the work state to the transport state.

FIG. 14 depicts the merger 1 in a work state. In the work state, the rotatable fingers 120 are in a counterclockwise rotated state as shown in FIG. 14. FIG. 15 depicts the beginning of the transition between the merger 1 from a work state to a transport state. The rotatable fingers 120 have rotated clockwise. In other words, the linear actuator 110 has extended sufficiently to cause the rotatable fingers 120 to abut the abutting surface 130. FIG. 16 shows the header assembly 60 after completion of the transition from the work state to the transport state. Thus, the header wheels 40 are lifted from the ground, and the header assembly 60 is locked in place by the rotatable fingers 120, which are fully engaged.

Figure 17:
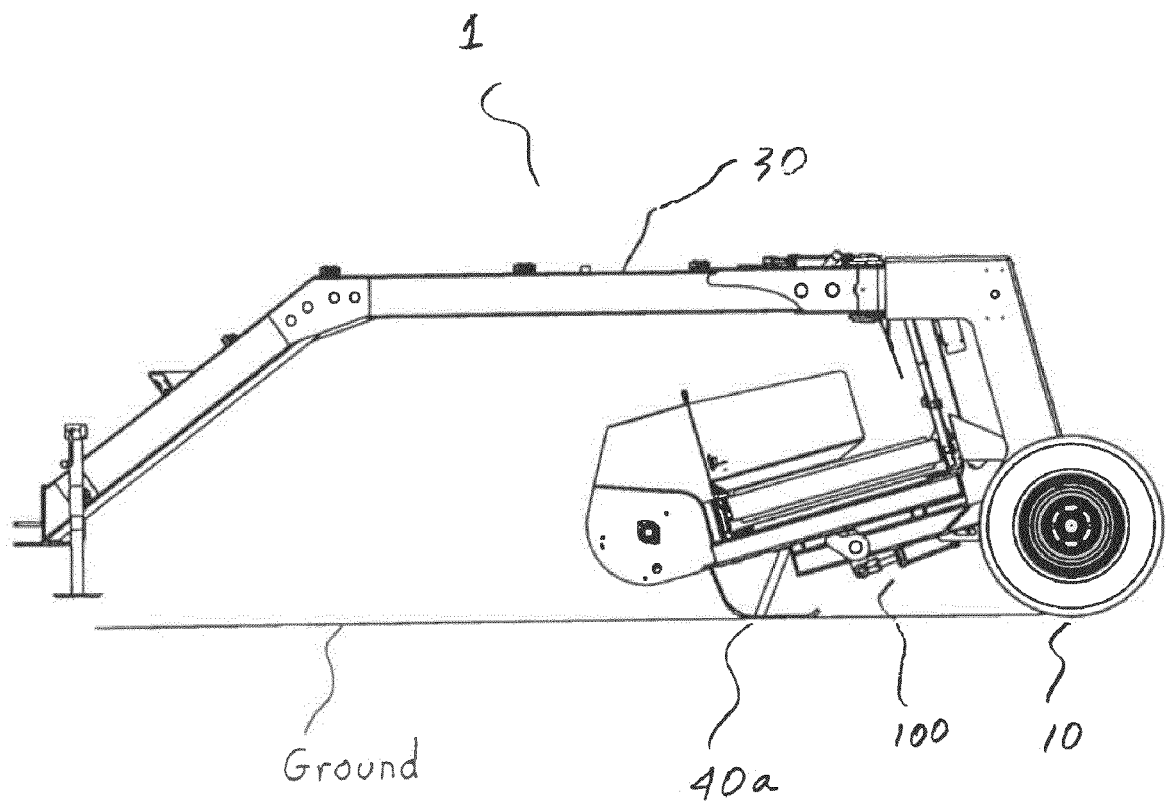
FIG. 17 is a left-side view of another embodiment of the invention.

FIG. 17 depicts the header assembly 60 with a variation of the header ground-engaging unit. In this embodiment, the header wheels 40 are replaced with skid-shoe 40a. In some applications, it is preferable to place the header ground-engaging units below the cross-conveyor 20 and/or the pick-up unit 50. This is so because this location allows the pick-up unit 50 to pick up crop material before the ground-engaging unit reaches the location of the crop material while the merger 1 is pulled in the direction D. In other words, placement of the ground engaging units below the pick-up unit 50 reduces trampling of the crop material. When placed below the cross-conveyor 20 and/or the pick-up unit 50, it is preferable that the ground engaging units are short (vertically) so as to allow the pick-up unit 50 to stay close to the ground and pick up material. Accordingly, in some cases, skis or rollers will function better than header wheels 40 as the header ground-engaging units. As the skid-shoe 40a is typically not used while the merger 1 is in the transport state, the skid-shoe 40a will contact the ground only when the merger 1 is in the work state, and therefore, will usually be used on soil or grass, not pavement.

Figure 18:
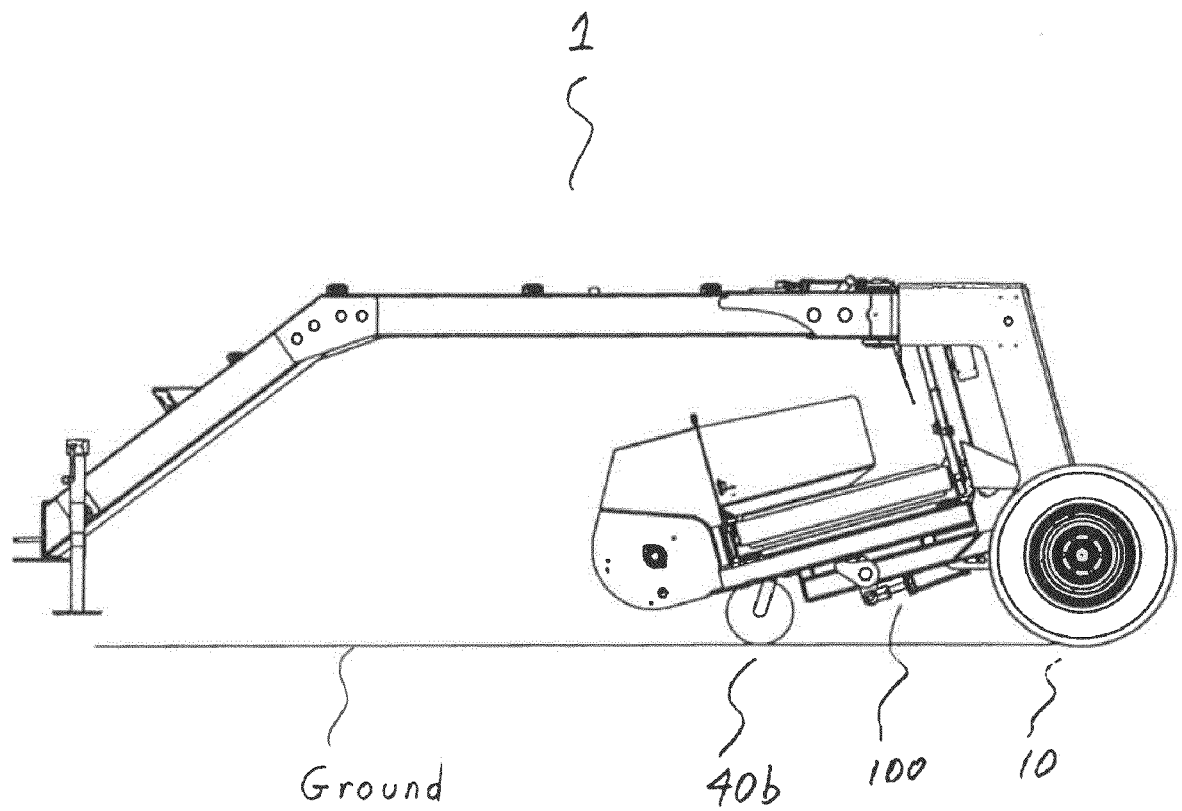
FIG. 18 is a left-side view of yet another embodiment of the invention.

FIG. 18 depicts the header assembly 60 with another variation of the header ground-engaging unit. In this embodiment, the header wheels 40 are replaced with at least one roller 40b functioning as the ground engaging unit. The roller 40b is typically wider relative to its height than is the header wheel 40. One example of the roller 40b is a broad cylinder coated with a layer of rubber. In the case of both the skid-shoe 40a and the roller 40b, there is typically an improvement in resistance to becoming clogged with mud in the field in comparison to the header wheel 40, which is typically a tire. Additionally, the roller 40b typically provides similar dimensional benefits to those discussed above regarding the skid-shoe 40a.

Regarding the pivot points described above, it should be noted that the pivot points are typically either provided with shaft and bushing arrangements or with shaft and ball-bearing mechanisms. However, other configurations of the bushings are also available, such as, for example, roller-bearing and shaft arrangements.

Although only certain embodiments of this invention have been described in detail above, those skilled in the art will readily appreciate that many modifications are possible in the exemplary embodiment without materially departing from the novel teachings and advantages of this invention. Accordingly, all such modifications are intended to be included within the scope of this invention.

The invention claimed is:

1. An agricultural crop merging machine configured to move in a direction of travel in a field, the merging machine comprising:
   a trailer frame including
   at least one axle,
   at least one trailer wheel coupled to the at least one axle and configured to rotate about a main axis of rotation and to roll along a field surface, and
   a drawbar assembly coupled to the at least one axle;
   a header assembly including
   a header frame,
   at least one header ground-engaging unit coupled to the header frame,
   a pick-up assembly coupled to the header frame, and
   a cross-conveyor assembly coupled to the header frame adjacent to the pick-up assembly, the pick-up and cross-conveyor assemblies being configured to cooperate to lift crop materials off the field surface and move the crop materials laterally to discharge onto the field surface to form a windrow; and
   a suspension assembly disposed between the trailer frame and header assembly, the suspension assembly being coupled to the header assembly and trailer frame and configured to allow the header assembly to pivot, relative to the trailer frame, about a first axis of rotation perpendicular to the main axis of rotation of the at least one wheel and to pivot about a second axis of rotation parallel to the main axis of rotation of the at least one wheel to follow a contour of the field surface,
   wherein the suspension assembly includes a pivot frame extending from the trailer frame to the header assembly, the pivot frame being coupled to the header assembly via a first pivot that allows the header assembly to pivot about the first axis of rotation, the pivot frame being coupled to the trailer frame via a second pivot that allows the header assembly to pivot about the second axis of rotation.

2. The agricultural crop merging machine according to claim 1, wherein the suspension assembly includes
   at least one linear actuator,
   wherein the at least one linear actuator is configured to change in length in response to a signal received by the at least one linear actuator, and the header assembly rotates relative to the trailer frame about the second pivot in response to the change in length of the at least one linear actuator.

3. The agricultural crop merging machine according to claim 2,
   wherein the at least one linear actuator is configured to rotate the header assembly about the second pivot such that the at least one header ground-engaging unit moves from a state in which the at least one header ground-engaging unit contacts the field surface to a state in which the at least one header ground-engaging unit does not contact the field surface.

4. The agricultural crop merging machine according to claim 3, wherein the suspension assembly includes at least one locking finger configured to rotate, in response to the change in length of the at least one linear actuator, from a locking position abutting the header assembly such that the header assembly is rigidly fixed relative to the first axis of rotation to a working position not abutting the header assembly and which allows the header assembly to rotate about the first axis of rotation.

5. The agricultural crop merging machine according to claim 2, wherein the linear actuator is a fluid-powered cylinder.

6. The agricultural crop merging machine according to claim 1, wherein the drawbar assembly is configured to pivot relative to the at least one axle about a pivot point with a third axis of rotation distinct from the first and second axes of rotation.

7. The agricultural crop merging machine according to claim 6, further comprising a second linear actuator coupled to the drawbar assembly and configured to rotate the drawbar assembly in response to a change in length of the second linear actuator.

8. The agricultural crop merging machine according to claim 1, wherein the at least one header ground-engaging unit includes two header ground-engaging units, and the header assembly is supported by only three points of contact, the two header ground-engaging units defining two of the three points of contact, and the suspension assembly defining the third of the three points of contact.

9. The agricultural crop merging machine according to claim 1, wherein the suspension assembly includes at least one locking finger configured to rotate from a locking position abutting the header assembly such that the header assembly is rigidly fixed relative to the first axis of rotation to a working position not abutting the header assembly and which allows the header assembly to rotate about the first axis of rotation.

10. The agricultural crop merging machine according to claim 9, wherein
the at least one locking finger is coupled to a linear actuator and rotates in response to a change in length of the linear actuator.

11. The agricultural crop merging machine according to claim 1, wherein the at least one header ground-engaging unit is a header wheel.

12. The agricultural crop merging machine according to claim 11, wherein the header wheel is a caster.

13. The agricultural crop merging machine according to claim 1, wherein the suspension assembly is disposed below the header assembly.

\* \* \* \* \*